(12) United States Patent
Baque

(10) Patent No.: US 8,590,800 B2
(45) Date of Patent: Nov. 26, 2013

(54) METHOD OF AUTHENTICATING AND/OR IDENTIFYING AN ARTICLE

(75) Inventor: Thomas Baque, Sch ñau (DE)

(73) Assignee: Polysecure GmbH, Freiburg (DE)

(*) Notice: Subject to any disclaimer, the term of this patent is extended or adjusted under 35 U.S.C. 154(b) by 41 days.

(21) Appl. No.: 13/133,232

(22) PCT Filed: Dec. 8, 2009

(86) PCT No.: PCT/DE2009/001722
§ 371 (c)(1),
(2), (4) Date: Jul. 1, 2011

(87) PCT Pub. No.: WO2010/066237
PCT Pub. Date: Jun. 17, 2010

(65) Prior Publication Data
US 2011/0253783 A1    Oct. 20, 2011

(30) Foreign Application Priority Data
Dec. 8, 2008 (DE) .................. 10 2008 060 675

(51) Int. Cl.
*G06K 19/00* (2006.01)
(52) U.S. Cl.
USPC .......... 235/494; 235/454; 235/491; 235/493; 382/177; 382/321
(58) Field of Classification Search
USPC ......... 235/492, 493, 494, 462, 454, 468, 469, 235/491; 250/365; 382/112, 321, 170, 382/176–179, 182, 187; 380/54, 59
See application file for complete search history.

(56) References Cited

U.S. PATENT DOCUMENTS

| | | | |
|---|---|---|---|
| 3,663,813 A | 5/1972 | Shaw | |
| 4,445,225 A | 4/1984 | White | |
| 5,670,239 A | 9/1997 | Hampp | |
| 5,867,586 A | 2/1999 | Liang | |
| 6,276,607 B1 * | 8/2001 | Sato | ............................. 235/487 |
| 2004/0125988 A1 * | 7/2004 | Coetzee et al. | ............... 382/112 |
| 2006/0054825 A1 | 3/2006 | Lambert et al. | |

FOREIGN PATENT DOCUMENTS

| | | |
|---|---|---|
| DE | 2433628 | 8/1982 |
| DE | 19645630 | 5/1998 |
| DE | 10083295 | 2/2002 |
| EP | 0911626 | 10/1998 |
| EP | 1178429 | 2/2002 |
| EP | 1843144 | 10/2007 |
| WO | 2008071052 | 6/2008 |

OTHER PUBLICATIONS

PCT/DE2009/001722; PCT International Search Report and Written Opinion of the International Searching Authority dated Apr. 23, 2010.

* cited by examiner

*Primary Examiner* — Michael G Lee
*Assistant Examiner* — Tabitha Chedekel
(74) *Attorney, Agent, or Firm* — Renner, Otto, Boisselle & Sklar, LLP

(57) ABSTRACT

The present invention relates to a method of authenticating and/or identifying an article containing a chemical marking agent, which is substantially inseparably enclosed in a marker as a carrier and contains selected chemical elements and/or compounds in the form of marker elements, in concentrations based on a predetermined encryption code, which method comprises the steps of:
i) qualitatively and/or quantitatively identifying the marker elements of the chemical marking agent, and
ii) comparing the values identified in step (i) with the predetermined encryption code.

15 Claims, No Drawings

METHOD OF AUTHENTICATING AND/OR IDENTIFYING AN ARTICLE

The present invention relates to a method of authenticating and/or identifying an article, inter alia for proving the identity of originals or for providing protection against counterfeits, by using a chemical marking agent.

It is well known that technical and other high-value products are frequently copied illicitly. In the process, the companies concerned and also the economy as a whole suffers a great loss. Furthermore, the copied products are often of poor quality. Since the customer is not aware of the fact that it is a counterfeit, he projects any defects regarding the low quality onto the brand; so that the manufacturers suffer enormous damage to their image.

Thanks to technical advances, many products produced in series, such as plastic parts, machinery parts and articles of clothing, can nowadays be copied virtually perfectly, at least macroscopically. It is therefore difficult, if not impossible, in many cases to distinguish genuine original products from counterfeit goods, so that original products have to be specially marked with additional features in an effective and economical manner, in order to distinguish them.

According to the state of the art, labels in particular can be applied to the surface of the article in order to mark a genuine original. For the marking per se, labels of this kind then need to have visible or concealed security features which can be unambiguously and reproducibly detected or measured as an authentication code. Security features may be a particular pattern (e.g. barcodes, holograms, micrographics, guilloché patterns), a particular colour or ink, electronic information (e.g. in RFID chips) and much more.

The disadvantage of labels and something which restricts their use for many applications is their limited mechanical and thermal stability. In particular, they may come unstuck or be damaged if a load is applied to the surface of the article to be marked. Furthermore, it may not be possible, for technical reasons, to apply labels to small items or articles such as a turbine blade, the surface of which does not allow for any modification. In addition, the labels are accessible, which means that they can often be copied, so that there is no effective protection against counterfeit articles. Moreover, the relatively high individual costs are an obstacle, especially with products produced in series in large numbers and where the individual articles are of low value.

Apart from labels, the state of the art includes some approaches and methods concerned with marking the surface of an article directly. Examples that can be mentioned are: the creation of a pattern or surface structuring by laser ablation and similar procedures, the targeted incorporation of fluorescent or luminescent substances or pigments, the targeted incorporation of substances which can be detected via a chemical and/or biological reaction. In this case too, the disadvantages of such processes and something which restricts their use is their lack of mechanical and thermal stability, the modification of the surface, their accessibility and therefore the possibility of copying them and in some cases the great complexity and high cost of detecting the security feature.

Apart from these methods, there are only a small number of approaches known in the state of the art for introducing elements and/or compounds into the bulk of an article in a targeted manner and detecting them by various measuring methods.

EP 1 556 837 B1, for example, describes a process according to which fluorescent compounds are introduced into objects and detected by exciting them with visible light at least with regard to their presence or absence. The spectroscopic result is compared with the spectroscopic result of the original (=authentication code), thus furnishing the evidence that it is a genuine original.

DE 100 83 295 T1 describes a similar method, where in this case at least one marker substance emits an X-ray beam when excited with a beam of energy, the marked article is a carpet, and the marker substance is introduced by coating the article. The security feature is the composition of the marker substance, which is measured by means of X-ray fluorescence analysis.

U.S. Pat. No. 4,445,225 describes a process in which marker substances incorporated in the article are not distributed homogeneously in the bulk of the article, but are localised in specific places of the surface. As a result, the marking effect, like the coating in DE 100 83 295 T1, is only located on the surface. In similar ways, DE 44 45 004 A1, DE 196 45 630 A1 and EP 0 911 626 A1 are concerned with detecting marker substances by means of X-ray fluorescence analysis.

What is not described or solved according to state of the art, however, is simultaneously solving the problems and challenges arising in practical applications.

Firstly, a method which marks articles, materials, coats and the like homogeneously in their bulk ("bulk effect"), so that it is irrelevant at which location or through which fraction of the article the marking is detected.

Secondly, a marker which is specifically produced as a completely inert, thermally and mechanically extremely stable additive, which as a whole and/or whose components do not change their position and concentration in the marked object, i.e. in particular do not diffuse and/or extract and/or enter into and/or trigger reactions in the bulk or on the surface of the article.

Without these above-mentioned properties, alone or in combination, marking cannot satisfy the requirements to be met by an industrial product (produced in series) in terms of reproducible, reliable, chemical-structural stability and inertness. An extracting marker, for example, can not only impair the reproducibility of the detection of the marking, but may also trigger unwanted or even toxic reactions, which can limit and/or cancel out the application and marketing approval of a product.

It is an object of the present invention to provide a method of authenticating and/or identifying an article, with which the above-mentioned disadvantages from the state of the art are overcome and the problems described as occurring in practical application are at least partially solved.

In this respect, it is intended to provide a method which enables a chemical marking agent to be identified qualitatively and/or quantitatively, and which can be integrated homogeneously and stably in the bulk of the article during the production of the article.

The method is also intended to make it possible reliably to determine or check a predetermined encryption code by means of selected chemical elements and/or compounds, and to do so preferably on the basis of the concentration of the elements and/or compounds.

The problem is solved by a method with the features of claim 1. Preferred embodiments can be gathered from the dependent claims.

This problem is solved by a method of authenticating and/or identifying an article containing a chemical marking agent, which is substantially inseparably enclosed in a carrier, being the actual "marker", and selected chemical elements and/or compounds, so-called marker elements, in concentrations according to a predetermined encryption code, which method comprises the steps of:

i) qualitatively and/or quantitatively identifying the marker elements of the chemical marking agent, and ii) comparing the values identified in step (i) with the predetermined encryption code.

In this context, it is preferable for the encryption code to be a numerical value which is established by the concentrations of the marker elements and/or the positions of the marker elements within a sequence.

The numerical value is particularly preferably a numerical value based on the decimal system.

It is also preferable for the encryption code to be established by the concentration of the marker elements and/or the positions of the marker elements compared to at least one chemical reference element and/or a chemical reference compound.

The variant with the relative concentrations always makes sense whenever the concentration of the marking agent, and hence the marker elements, cannot be controlled in the article to be marked and therefore the absolute concentrations cannot be determined in advance. It is always possible to weigh in relative quantities of the marker elements and the reference element.

A further advantage of this variant is that by measuring the concentration of the reference element, it is possible, where applicable, to determine the dilution of the chemical marking agent and hence of the material of the article.

A preferred embodiment is characterised by the fact that the chemical marking agent contains 4 to 40 marker elements, preferably 8 to 24.

It is also preferable, in accordance with the invention, for the marker elements to be present in each case in concentration ranges which differ from one another and/or a reference element where applicable by a factor of 1-20, preferably 2-10.

In this context, it is preferable for the number of concentration ranges to form the base and the number of marker elements to form the power of the numerical system on which a concentration matrix of the marker elements is mapped.

According to the invention, concentration ranges are particularly preferred which can be differentiated unambiguously, for example by means of X-ray fluorescence analysis of the marker elements.

With the chemical marking agent, it is then possible unambiguously to generate a number, namely the authentication code, as follows: the number of concentration ranges forms the base of a meaningful and then predetermined numerical system, e.g. a binary, tertiary or quaternary numerical system.

According to the invention, the base can range from 2-10, preferably from 4-6, which would mean that 4-6 concentration ranges could be differentiated unambiguously.

The concentrations of the marker elements are then assigned to the concentration ranges, which corresponds to a scaling to the predetermined numerical system. In the quaternary numerical system, the concentration values are therefore assigned to one of four concentration ranges, so that the concentrations can be completely mapped onto the numbers 0-3.

The number of different marker elements then gives rise to the power or the number of places in the numerical system. Among the marker elements, it is then only necessary to determine the position or place of the marker element concerned, i.e. in the quaternary system: zero position, four position, sixteen position etc.

This means that analysing the composition and concentration of the marker elements produces an unambiguous numerical value for given concentration ranges, as a function of the numerical system and the position of the individual marker element. An article is genuine if that numerical value corresponds to the numerical value of the original, i.e. the authentication code.

One advantage of the method of the invention is that the base of the numerical system and the places of the marker elements can be laid down, but can simply also be changed. The consequence of this is that, depending on how the numerical system and the places of the marker elements are laid down, a particular marker can map more than one number and can therefore be used more than once.

Metals are preferably used as marker elements, particularly preferably the elements of groups II to VI, including the subgroups I to VIII and the periods 4 to 6. Corresponding metal compounds in the form of salts or oxides can likewise be used.

The basic material of the marker is preferably temperature and/or chemical-resistant and/or mechanically resistant. It can be made of glass and/or a ceramic material.

In order to integrate the marker elements into the marker, the elements, salts or oxides can first be suspended or dissolved in water, after which the solution or suspension is blended homogeneously by filtration, centrifugation and subsequent drying.

The premix obtained in this way, i.e. the marking agent, is now mixed and/or milled with the basic material of the marker and subsequently combined into a uniform mixture in a thermal process (preferably annealing, melting or sintering, particularly preferably melting). The mixture is processed into powder with a defined particle size distribution by crushing and milling and other measures known in the state of the art. The particle size of the marker is from 1 nm to 5,000 μm, preferably 50 nm to 200 μm.

It is also preferable that the concentrations of the marker elements in the marker should be in the range from 10-100,000 ppm, preferably 10-1,000 ppm, based on the total amount of the marker.

The marker obtained in this way, containing the chemical marking agent, may additionally be mixed with surface-modifying agents and/or dispersants. After production, the marker may either be integrated into the material of the article or applied to the surface of the article, depending on the nature of the article.

According to the invention, the articles to be marked preferably comprise all materials, coats, especially plastic, metal, paint, coating, glass, ceramics, fabrics, leather, paper, cardboard and/or adhesive.

Finally, it is preferable that physical/chemical methods and/or wet chemical methods, preferably atom absorption spectroscopy (AAS), inductively coupled plasma (ICP) or X-ray fluorescence analysis (XRF), are used for the qualitative and/or quantitative identification in step (i).

If the substance of the material is analysed beforehand and these results are taken into account, it is also possible, by weighing in a precise amount of the chemical marking agent, to compensate for background concentrations, which considerably reduces the "background noise" in the spectroscopic analysis.

According to the invention, it has surprisingly been found that the method proposed makes it possible reliably and unambiguously to identify and authenticate articles. The chemical marker elements can be qualitatively and/or quantitatively identified in a simple manner, which then allows them to be compared to the encryption code.

In addition, it has surprisingly been found, in accordance with the invention, that the methods described above for producing the markers leads to powder mixtures which are unambiguous with regard to the distribution of the sizes and shapes of the particles. That distribution, and hence the composition of the particles in the powder mixture, is a stochastic consequence of the production of the marker, i.e. in particular the mixing, melting, milling and sintering processes. The distribution can be determined with sufficient accuracy and differentiation by characterising processes such as FFF analysis. In this respect, every production of a marker is unique. No marker can therefore be reproduced or copied.

An essential element of the method of the present invention is the provision of the chemical marking agent in a carrier, the marker, in which it is enclosed substantially inseparably, as described. This procedure leads to a reduction in the extractability of the chemical elements and/or compounds. There can therefore neither be any depletion of the elements and compounds in the carrier when they are in constant contact with a medium, nor is the medium itself contaminated. This is of great practical importance, especially when the article, for example in the form of storage containers, comes into contact with foodstuffs or commodities. Since glasses and ceramic materials as carriers are very resistant to attack by almost all media, the extraction resistance of the chemical marking agent can be increased considerably.

Similarly, it has surprisingly been found that the chemical reactivity of the chemical marking agent is reduced by inclusion in the basic material of the marker or in the marker itself. Many compounds of metals are capable of acting as catalysts. Especially in the case of reactive systems (e.g. polyester resins, epoxy resins, etc.), the direct introduction of compounds of this kind without a carrier can therefore trigger an unwanted reaction and/or considerably reduce the durability of the systems or preproducts.

If the material of the article consists of plastic, then depending on the nature of the plastic, the marking agent can be incorporated into the mixture by dispersion (suspension in a plastic solution, extrusion, kneading, etc.). The concentration in the plastic in this case is preferably 0.05-5% by weight, preferably 0.1-0.5% by weight, based on the weight of the plastic. In order to improve the dispersion, a concentrate of the marker can first be prepared and then blended with the plastic in any of the standard processing methods, such as extruding, injecting moulding, calendering, spinning, etc. Corresponding methods are known in the state of the art.

When coating materials are used (e.g. paints, lacquers, ink or other coatings) the chemical marking agent or the marker can be added to the coating material directly during the production process, where dispersion is preferably effected together with the pigments and/or fillers needed for the production of the coating materials. The dispersion can be performed with the standard equipment used in the production of the coating materials. The concentration in the system is preferably 0.1 to 10% by weight, more preferably 0.5 to 2% by weight, based on the total amount of the coating materials.

In order to improve dispersion, it is possible first to make a paste—before dispersing it in a suitable solvent. For this purpose, standard equipment with which the skilled person is familiar can be used, such as dissolvers, kneaders, rotating drum, bead mills, mixers, stirrers etc. The coating material is applied to the article in the usual way by painting, spraying, plasticising, immersion painting, printing or other processes with which the skilled person is familiar.

In order to analyse an article—e.g. in order to prove it is a genuine original—, the composition and concentration of the chemical marking agent is determined in at least one part of the article. Physical/chemical methods, such as atom absorption spectroscopy (AAS), inductively coupled plasma (ICP) or X-ray fluorescence analysis (XRF), are preferably used.

As a rule, the composition and concentration can be measured directly, without any further chemical or physical preparation. In addition, however, it is also possible to concentrate the marker and the chemical marking agent in a targeted manner, using methods with which the skilled person is familiar. Concentration can be effected by, for example, dissolving part of the article or the coating material in a suitable solvent and separating the marker and chemical marking agent by filtration, centrifugation or other methods. Alternatively, it is also possible to incinerate the article. The proportions of the elements are then identified using the same methods as with direct analysis.

One major advantage of the method of the invention is that the chemical marking agent can be used in various substrates or articles. In this way, articles consisting of different materials can be protected with the same chemical marker.

Further features and advantages of the method of the invention can be gathered from the following description of a practical embodiment.

In the following, there is first a description of how, by way of example, an encryption code can be created after selecting certain chemical elements in different concentrations, using a binary numerical system.

A total of eight chemical elements should be used to produce a chemical marking agent, which are listed at the bottom left in Table 1. These elements are titanium, vanadium, chromium, manganese, cobalt, nickel, gallium and arsenic. Based on the binary numerical system, the position of arsenic, for example, is intended to correspond to BIT number 1. That corresponds to the zero position in the decimal system. The allocation of the elements to the other BIT numbers and thus to the order of the elements in order to define the encryption code can thus likewise be gathered from the left-hand column of Table 1. Chromium, for example, corresponds to the BIT number 6. If the chromium concentration corresponds to the value 1, this results in 1 times $2^6$, i.e. the number 32.

The eight elements selected can be present in two different concentration ranges, namely in a concentration range of about 1,000 ppm or a concentration range of about 10,000 ppm. If a chemical element is present in the chemical marker in a concentration of about 1,000 ppm, the binary numerical value "0" is assigned to that concentration. If chemical elements are present in a concentration of about 10,000 ppm, the binary numerical value "1" is assigned to that concentration.

Since there are a total of two concentration ranges in the present example, the base of the numerical system is 2, so that this accordingly results in the use of a binary numerical system. The power of this numerical system is 8, since a total of 8 chemical elements are present.

TABLE 1

| Elements | | Concentration | |
|---|---|---|---|
| BIT no. | Element: | Level | Concentration |
| 8 | titanium | 0 | 1,000 ppm |
| 7 | vanadium | 1 | 10,000 ppm |
| 6 | chromium | | |
| 5 | manganese | | |
| 4 | cobalt | | |
| 3 | nickel | | |
| 2 | gallium | | |
| 1 | arsenic | | |

The following Table 2 once again provides a survey of how the selected chemical elements are arranged in a sequence, taking into account the BIT numbers and the associated values in decimal numbers. In addition, Table 2 shows the concentrations of the chemical elements, which are intended to be provided by way of example in order to produce the chemical marking agent. Titanium, for example, is supposed to be present in a concentration of 10,000 ppm, whereas chromium, nickel and arsenic are supposed to be used in a concentration of 2,000 ppm. A concentration of 2,000 ppm here is rounded down to the concentration range of 1,000 ppm, so that the binary numerical value "0" is also assigned to concentrations of 2,000 ppm.

TABLE 2

| Position | BIT 8 | BIT 7 | BIT 6 | BIT 5 | BIT 4 | BIT 3 | BIT 2 | BIT 1 |
|---|---|---|---|---|---|---|---|---|
| Element | Ti | V | Cr | Mn | Co | Ni | Ga | As |
| Value | 128 | 64 | 32 | 16 | 8 | 4 | 2 | 1 |
| Concentration ppm | 10,000 | 10,000 | 2,000 | 10,000 | 10,000 | 2,000 | 10,000 | 2,000 |

After the binary numerical system is converted into the decimal numerical system, the exemplary embodiment of the marking agent shown in Table 2 should have a numerical value of "218", which is obtained, taking into account the states 0 and 1 of the concentrations listed in Table 5, by adding the element values assigned according to those states.

In the present example, in order to produce 100 g of a marker containing the marker elements, 90.1529 g glass powder (soda-lime glass) are mixed with the marker elements listed in Table 3 (titanium oxide, divanadium trioxide, dichromium dioxide, dimanganese trioxide, tricobalt tetra-oxide, nickel oxide, digallium trioxide and arsenic tetra-oxide) in the concentrations shown. In addition, 2,000 g zinc oxide are added as flux (not shown).

This means that in the present example, the absolute concentrations of the chemical elements and/or compounds, and also their order, are used in order to define an encryption code. The mixture was finely ground using water and isopropanol, with a ball mill for example. The mixture was then centrifuged and dried in the drying cabinet. After that, the mixture was placed in a crucible and melted in a crucible furnace at 1,500° C. to form a homogeneous blend.

The melt was then carefully poured into a basin filled with a copious amount of water. The granules formed in the process were first roughly comminuted with a jaw crusher and then ground into a fine powder with a maximum particle size of 2 µm, using a ball mill.

The concentrations of the elements, the chemical compounds used, the amounts weighed in can be seen in Table 3.

TABLE 4

| Material | Trade name Example | % amount |
|---|---|---|
| Polyamide 6 | Ultramid ® B3 (BASF) | 96.0 |
| Calcium stearate | Calziumstearat 800 (Greven) | 1.0 |
| Heat stabiliser | Irganox ® 1098 (Ciba) | 0.5 |
| Dye | Printex ® 60 (Degussa) | 0.5 |
| Marker | | 2.0 |

In order to detect the chemical marker prepared in the above example in the polyamide material, about 10 g polyamide material are dissolved in trifluoroethanol in the course of the analysis. The residue is centrifuged off, suspended with trifluoroethanol, and centrifuged off again. Using a pressing agent, a tablet is produced. The content of the elements used in the chemical marking agent is determined by RFA. Table 5 shows the corresponding analytical results. The concentrations of the individual elements found are converted into binary numerical values, depending on the concentration range. With the correct position of the BIT numbers, the binary numerical values "0" and "1" can then be converted into decimal numerical values, which finally results in a total

TABLE 3

| Element | Ti | V | Cr | Mn | Co | Ni | Ga | As |
|---|---|---|---|---|---|---|---|---|
| Concentration ppm | 10,000 | 10,000 | 2,000 | 10,000 | 10,000 | 2,000 | 10,000 | 2,000 |
| Substance | $TiO_2$ | $V_2O_3$ | $Cr_2O_3$ | $Mn_2O_3$ | $Co_3O_4$ | NiO | $Ga_2O_3$ | $AsO_4$ |
| Concentration % | 1.519 | 1.4711 | 0.2923 | 1.4368 | 1.3620 | 0.2545 | 1.3442 | 0.3708 |
| Amount weighed in g | 1.2519 | 1.4711 | 0.2923 | 1.4368 | 1.3620 | 0.2545 | 1.3442 | 0.3708 |

The formulation shown in Table 4 is used to prepare a polyamide material, for example to be used for moulded articles made from non-metallic or non-metallic and metallic elements, which is to be equipped with the marker from the embodiment described above (Table 1). The mixture is melted and dispersed in a twin screw extruder with the material at a temperature of 240-250° C. The mixture is discharged through an extrusion die, cooled in a water bath and then granulated. The compound prepared in this way can be processed into finished parts.

numerical value of 218. This total numerical value of 218 corresponds to the decimal numerical value originally intended.

TABLE 5

| Sequence | BIT 8 | BIT 7 | BIT 6 | BIT 5 | BIT 4 | BIT 3 | BIT 2 | BIT 1 | |
|---|---|---|---|---|---|---|---|---|---|
| Element: | Ti | V | Cr | Mn | Co | Ni | Ga | As | |
| Value | 128 | 64 | 32 | 16 | 8 | 4 | 2 | 1 | |
| Concentration ppm | 9,645 | 10,560 | 1,880 | 10,800 | 11,050 | 2,034 | 10,211 | 1,920 | |
| High/Low | 1 | 1 | 0 | 1 | 1 | 0 | 1 | 0 | |
| Code | 128 | 64 | 0 | 16 | 8 | 0 | 2 | 0 | 218 |

As can be seen from the examples given above, it is thus possible, with the method of the invention, to authenticate and/or identify an article in a simple and effective manner. For this purpose, a chemical marking agent is substantially inseparably enclosed in a carrier and integrated into the material of the article. The chemical marking agent contains selected chemical elements and/or compounds in concentrations based on a predetermined encryption code. In this context, it is preferable for the predetermined encryption code to be a numerical value which is established by the concentrations of the marking agent elements selected and/or the positions of the marker elements in the numerical system. When the encryption code is known, it can be established in a simple manner by analysing the material of an article whether the article is a genuine original or a counterfeit article.

The features disclosed in the claims and in the description can be essential to implementing the invention in its various embodiments both individually and in any combination.

The invention claimed is:

1. A method of authenticating and/or identifying an article containing a chemical marking agent, which is substantially inseparably enclosed in a marker as a carrier and contains a plurality of selected chemical elements and/or compounds, to form marker elements, the selected chemical elements and/or compounds present in the marker elements in a ratio of concentrations according to a predetermined encryption code, which method comprises the steps of:
   i) qualitatively and/or quantitatively identifying the marker elements of the chemical marking agent, and
   ii) comparing the values identified in step (i) with the predetermined encryption code.

2. The method as claimed in claim 1, characterised in that the encryption code is a numerical value which is established by the concentrations of the chemical elements and/or compounds in the marker elements and/or the positions within a sequence of the chemical elements and/or compounds in the marker elements.

3. The method as claimed in claim 2, characterised in that the encryption code is established by the concentrations of the chemical elements and/or compounds in the marker elements and/or the positions in the sequence of the chemical elements and/or compounds in the marker elements compared to at least one chemical reference element and/or a chemical reference compound.

4. The method as claimed in claim 1, characterised in that the chemical marking agent contains 4 to 40 marker elements.

5. The method as claimed in claim 1, characterised in that the chemical elements and/or compounds in the marker elements are present in each case in concentration ranges which differ from one another and/or a reference element where applicable by a factor of 1-20.

6. The method as claimed in claim 5, characterised in that the number of concentration ranges forms the base and the number of marker elements forms the power of a numerical system on which a concentration matrix of the marker elements is mapped.

7. The method as claimed in claim 6, characterised in that the range of 2-10 serves as the base.

8. The method as claimed in claim 1, characterised in that the concentrations of the chemical elements and/or compounds in the marker elements in the marker are in the range from 10-100,000 ppm, based on the total amount of the marker.

9. The method as claimed in claim 1, characterised in that the material of the marker is temperature and/or chemical-resistant and/or mechanically resistant.

10. The method as claimed in claim 9, characterised in that the marker elements are substantially inseparably enclosed in the marker by annealing, sintering or melting with the basic material of the marker.

11. The method as claimed in claim 9, characterised in that the basic material of the marker is made of glass and/or a ceramic material.

12. The method as claimed in claim 1, characterised in that the marker has a particle size of 1 nm-5,000 μm.

13. The method as claimed in claim 1, characterised in that the article to be marked comprise plastic, metal, paint, coating, glass, ceramics, fabrics, leather, paper, cardboard and/or adhesive.

14. The method as claimed in claim 1, characterised in that physical/chemical methods and/or wet chemical methods are used for the qualitative and/or quantitative identification in step (i).

15. The method as claimed in claim 1, characterized in that atom absorption spectroscopy (AAS), inductively coupled plasma (ICP) or X-ray fluorescence analysis (XRF), are used for the qualitative and/or quantitative identification in step (i).

* * * * *

UNITED STATES PATENT AND TRADEMARK OFFICE
CERTIFICATE OF CORRECTION

PATENT NO.        : 8,590,800 B2                                        Page 1 of 1
APPLICATION NO. : 13/133232
DATED             : November 26, 2013
INVENTOR(S)       : Thomas Baque It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 65 days.

Signed and Sealed this
Twenty-second Day of September, 2015

Michelle K. Lee
*Director of the United States Patent and Trademark Office*